Oct. 27, 1959 H. W. PATTON 2,910,643

DEGENERATIVE MAGNETIC AMPLIFIER

Filed May 16, 1955

INVENTOR.
HENRY W. PATTON

BY [signature]

ATTORNEY

United States Patent Office 2,910,643
Patented Oct. 27, 1959

2,910,643

DEGENERATIVE MAGNETIC AMPLIFIER

Henry W. Patton, Cedar Rapids, Iowa, assignor to Collins Radio Company, Cedar Rapids, Iowa, a corporation of Iowa Application May 16, 1955, Serial No. 508,717

2 Claims. (Cl. 323—89)

This invention relates to magnetic amplifier circuits and more particularly to such circuits which are half-wave voltage controlled and which combine two half-wave output signals to produce a full-wave output signal employing feedback control to regulate the output.

Magnetic amplifier circuits have previously been constructed using feedback. Magnetic amplifiers have also been constructed in which one output core is controlled by the output from another magnetic core in a well-known manner, such circuits being known as phase inverters. With these prior magnetic amplifier circuits it is not possible to obtain linear amplification with feedback. With these prior circuits, it has not been practical to employ a feedback in a single half-wave stage. This occurs because the first core is under the influence of the power winding during the firing cycle and its control winding will therefore not respond to ordinary values of the control signal. It has also been impractical to make the inverter stage follow the commands of the control stage without elaborate circuitry, particularly in the presence of variable loads such as motors which may produce a back electro-magnetic force. Due to this back electro-magnetic force of a motor load, or in the case of complex loads, the inverter stages of known magnetic amplifier circuits may produce more or less than the ideal amount of output signal which results in non-linearity within the amplifier. The prior magnetic amplifier circuits have exhibited poor control characteristics. Additionally, in many of the present magnetic amplifier circuits, the control of the inverter stage is not linear.

In an ideal magnetic amplifier circuit having two stages without feedback, the control stage should operate independently of the inverter stage. Existing magnetic amplifier circuits exhibit an inter-action whereby the inverter stage introduces undesired signals to the control stage and poor magnetic amplifier performance results. It is desirable that in magnetic amplifier circuits the inverter stage exactly follow the control stage. It is further desirable that the control coupling circuit be unidirectional and independent of load characteristics. This invention is a magnetic amplifier circuit which uses feedback to control one of a plurality of cascaded magnetic amplifiers to produce a full-wave output signal. This magnetic amplifier circuit has linear amplification and is able to utilize input signals of alternating current, direct current, pulses, or combinations thereof.

This invention is a magnetic amplifier circuit having two or more inductors which are similar in magnetic and control characteristics. The single phase, full-wave output derived from this invention requires that the flux density in each core must be reset to the same value prior to conduction.

It is an object of this invention, therefore, to provide a magnetic amplifier circuit which operates on low energy input levels and produces linear amplification with high speed response.

It is a further object of this invention to provide improved means for controlling an inverter stage of a magnetic amplifier circuit from a control stage.

It is a further object of this invention to provide a single phase, full-wave output with a minimum of control circuitry.

It is another object of this invention to provide a magnetic amplifier circuit which resets one magnetic core during its normal reset half-cycle with the reset being controlled by part of the output signal from a related core.

It is a still further object of this invention to provide a magnetic amplifier circuit which produces a linear full-wave, single-phase output by utilizing feedback.

It is a still further object of this invention to provide a magnetic amplifier circuit which has a fast rise of the load current, and which minimizes changes in the load circuit.

It is a still further object of this invention to provide a magnetic amplifier circuit wherein the input circuitry may operate as a phase detector.

These and other objects of this invention will become apparent when the following description is read in conjunction with the drawing, in which.

Figure 1:
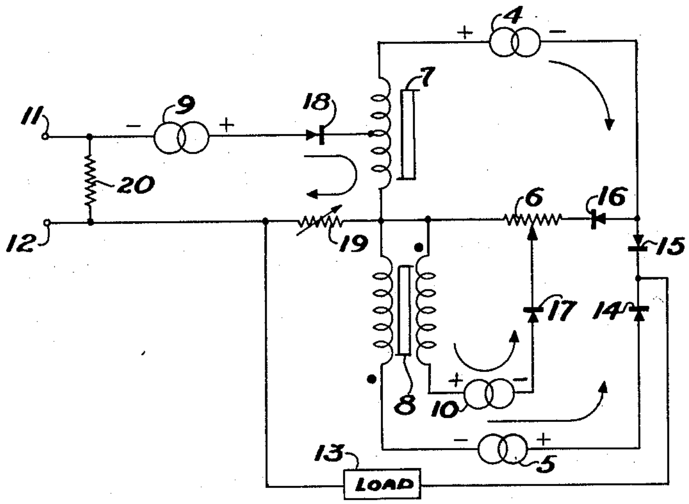
Figure 1 is a schematic representation of one embodiment of this invention.

Referring now to Figure 1, the generators 4 and 5 provide alternating current power for the magnetic reactors 7 and 8. The reset bias signals for the stages are provided by generators 9 and 10. It is to be understood, of course, that these generators may be replaced by transformers or any other suitable means of impresssing alternating current signals in the circuits. An input voltage applied to terminals 11 and 12 may be a half-wave, a full-wave, or a direct current signal, or any combination thereof. The load 13 may be any complex load. The diodes 14, 15, 16, 17, and 18 are for controlling the polarity of the current flow in the various circuits.

For purposes of description, it may be said that there are four principal circuits within the magnetic amplifier of this invention. There is the first control circuit comprising generator 9, diode 18, resistor 19 and one-half the winding on the reactor set; the first load circuit comprising the winding on inductor 7, generator 4, diode 15, and resistor 19 with a tap through diode 16 to the control circuit of the second stage; the control circuit of the second stage comprising diode 17, generator 10, and the winding on inductor 8; and the second stage load circuit comprising the winding on inductor 8, generator 5, diode 14, and resistance 19. The inter-action provided by this invention between these various circuits results in a magnetic amplifier that exhibits linear amplification from the two cascaded inductors to a single load. The inter-action also provides that the second stage is controlled by the output from the first stage. There are two time periods of importance; the firing or conductive period of the control stage and the firing period of the inverter stage.

During the reset period of reactor 7, an input signal is impressed upon the terminals 11 and 12 with a polarity such that terminal 11 is positive with respect to terminal 12 and generator 9 impresses an electro-magnetic potential with a polarity as indicated in Figure 1. Signal currents flowing through the input resistor 20 will combine with the reset current of the first stage and increase the reset of the first stage, thereby regulating the output signal of the first stage.

The saturation of reactor 7 during the next half-cycle will cause a large current to flow in the load through the first stage load circuit. This saturation and current result when generator 4 impresses an alternating voltage with polarities opposite those shown in Figure 1. When reactor 7 saturates and the power current flows in the first stage load circuit, a portion of this current is diverted through the diode 16 and the resistor 6 of the second stage control circuit. This current flowing in the second stage control circuit then aids the flow of current being impressed upon the second stage control circuit at this instant by generator 10, which is generating a voltage opposite in polarity to the polarity shown in Figure 1. This action or combination of currents in the control circuit of the second stage will control the reset of inductor 8. This control of the reset of inductor 8 is accomplished because generator 5 is impressing a voltage with polarities opposite those shown in Figure 1 on the second stage load circuit and this voltage permits the free control of reactor 8 by the second stage control circuit.

During the next half-cycle of the input signal, which is the firing period of the inverter stage, the polarities of the voltages are as indicated in Figure 1. When this occurs, the current through the feedback resistor 19 resulting from the load current caused by the saturation of inductor 8 aids the instantaneous signal of the generator 9 and thereby increases the reset value applied to inductor 7. Thus it is seen that the second inductor 8 is controlled as to its reset by the current resulting from the conduction of the first inductor, and the second inductor 8 controls the first inductor's reset by the current which flows through the load as the result of the second inductor's saturation and conduction.

Figure 2:
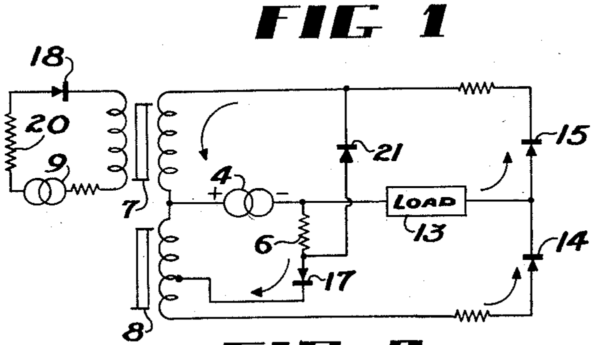
Figure 2 is a schematic representation of another embodiment of this invention.
Figure 3:
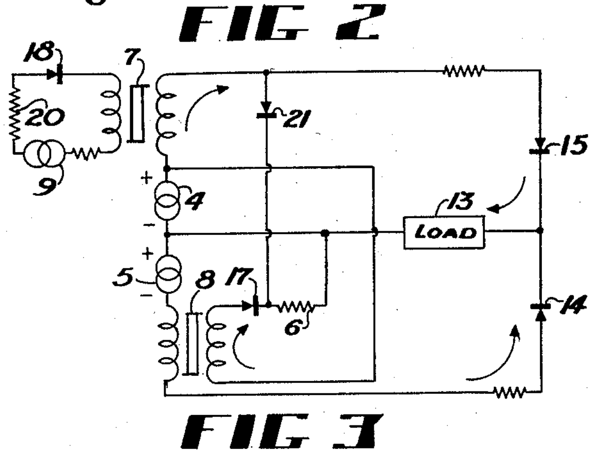
Figure 3 is a schematic representation of an embodiment of this invention.

Figures 2 and 3 comprise other embodiments of this invention for obtaining control of a second magnetic core from the output circuit of a first magnetic core and the entire magnetic amplifier circuit produces a linear output. The circuits of Figures 2 and 3 comprise essentially the same elements as Figure 1. However, the control circuit of the second stage is interconnected to the output circuit of the first stage whereby the current flow in the control circuit of the second stage is regulated by the firing of the first stage. This firing action prevents the reset of the second inductor. Thus, on the next half-cycle of the input signal, the controlled or second stage will generate an output signal which is equal to the output signal of the first stage. The output signals are a function of the firing angles of the respective inductors and are essentially independent of the load characteristics. The addition of resistors in the circuits of the two stages immediately preceding diodes 14 and 15 will improve the commutation and time response of the circuits if such improvement is required.

It is to be understood, of course, that the embodiments of Figures 2 and 3 could have feedback added with the same polarities as shown in Figure 1 to improve the linearity of the output signal. It is also understood that the autotransformers shown in the figures are not required for the proper operation of this magnetic amplifier circuit, but are more economical.

Although this invention has been described with respect to a particular embodiment, it is not to be so limited as changes and modifications may be made therein which are within the full intended scope of the invention, as defined in the appended claims.

What is claimed is:

1. A magnetic amplifier circuit including a first magnetic core device having an essentially rectangular hysteresis loop, said first magnetic core device including a control winding and an output winding thereon, a second magnetic core device having an essentially rectangular hysteresis loop, said second magnetic core including a control winding and an output winding thereon, an input signal, said input signal applied to the control winding of said first magnetic control device, a first control circuit and a first output circuit connected respectively to the control winding and the output winding of said first magnetic core device, said first control circuit comprising a resistance, a source of electromagnetic force and a unilateral conduction device, the first output circuit comprising a source of electromagnetic force and a unilateral conduction device, a second control circuit and a second output circuit connected respectively to the control winding and the output winding of said second magnetic core device, said second control circuit comprising a source of electromagnetic force, a resistance and a unilateral conduction device, said second control circuit connected to said first output circuit by unilateral conduction device whereby the source of electromagnetic force in said second control circuit is aided by the current flow in said first output circuit, said second output circuit including a source of electromagnetic force, a unilateral conduction device and a resistance, a load, and said load connected to said first and second output circuits whereby linear full-wave output signal is generated across said load with an input signal.

2. A magnetic amplifier circuit including a first and second magnetic core device having essentially rectangular hysteresis characteristic cores, a control winding and an output winding on each of said magnetic core devices, a first control circuit and a first output circuit, a second control circuit and a second output circuit each connected respectively to said control windings and said output windings on said magnetic core devices, an input signal, said input signal applied to said first control circuit, said first control circuit including a resistance, a source of electromagnetic force, a unilateral conduction device, said first output circuit including a source of electromagnetic force and a unilateral conduction device, said unilateral conduction devices being arranged whereby conduction is permitted through the windings on said first magnetic core device in oposite directions, said second control circuit including a source of electromagnetic force, a unilateral conduction device and a resistance, said second control circuit connected to the first output circuit by a unilateral conduction device which permits conduction in the same direction as the unilateral conduction device of said first ouput circuit, said second output circuit including a source of electromagnetic force, a resistance and a unilateral conduction device, a load, said first and said second output circuits connected to said load, and said second control circuit conjointly controlled by the current flow in said first output circuit and the curent flow in said second control circuit so that a linear full-wave output signal is generated across said load.

References Cited in the file of this patent

UNITED STATES PATENTS

| | | |
|---|---|---|
| 2,754,474 | Barnhart | July 10, 1956 |
| 2,786,177 | Werner | Mar. 19, 1957 |
| 2,797,384 | Brown | June 25, 1957 |

FOREIGN PATENTS

| | | |
|---|---|---|
| 1,034,318 | France | July 22, 1953 |